US012779923B2

(12) United States Patent
Jaber et al.

(10) Patent No.: US 12,779,923 B2
(45) Date of Patent: Nov. 3, 2026

(54) AXLE STRUCTURE FOR A COMMERCIAL VEHICLE CHASSIS HAVING AN AXLE BRIDGE

(71) Applicant: Trailer Dynamics GMBH, Eschweiler (DE)

(72) Inventors: Abdullah Jaber, Aachen (DE); Raid Mazyek, Stolberg (DE); Helko Mues, Aachen (DE); Tobias Krieg, Wallenhorst-Lechting (DE); Andreas Kröger, Lohne (DE); Dirk Zumdohme, Löningen (DE)

(73) Assignee: Trailer Dynamics GMBH, Eschweiler (DE)

(*) Notice: Subject to any disclaimer, the term of this patent is extended or adjusted under 35 U.S.C. 154(b) by 0 days.

(21) Appl. No.: 19/109,818

(22) PCT Filed: Sep. 7, 2023

(86) PCT No.: PCT/EP2023/074623
§ 371 (c)(1),
(2) Date: Mar. 7, 2025

(87) PCT Pub. No.: WO2024/052479
PCT Pub. Date: Mar. 14, 2024

(65) Prior Publication Data

US 2026/0084478 A1 Mar. 26, 2026

(30) Foreign Application Priority Data

Sep. 9, 2022 (DE) ..................... 10 2022 123 037.6

(51) Int. Cl.
*B60G 9/02* (2006.01)
*B60B 35/00* (2006.01)
*B60G 7/00* (2006.01)

(52) U.S. Cl.
CPC .............. *B60G 9/02* (2013.01); *B60B 35/004* (2013.01); *B60G 7/003* (2013.01); *B60G 7/008* (2013.01);
(Continued)

(58) Field of Classification Search
CPC .......... B60G 9/02; B60G 7/008; B60B 35/004
See application file for complete search history.

(56) References Cited

U.S. PATENT DOCUMENTS 4,415,179 A * 11/1983 Marinelli .............. B60G 9/003 280/683
6,328,322 B1 * 12/2001 Pierce .................... B60G 7/001 280/124.167
(Continued)

FOREIGN PATENT DOCUMENTS

DE 4338651 A1 * 3/1995 ............. B60G 9/022
EP 1634731 A1 3/2006
(Continued)

OTHER PUBLICATIONS

International Search Report dated Dec. 7, 2023, issued in corresponding application PCT/EP2023/074623.
(Continued)

*Primary Examiner* — Karen Beck
*Assistant Examiner* — Tiffany L Webb
(74) *Attorney, Agent, or Firm* — Millen, White, Zelano & Branigan, P.C.; Christopher W. Brody

(57) ABSTRACT

The present invention relates to an axle structure (6) for a commercial vehicle chassis having a wheel axle (R), the spatial position of which is determined by axes of rotation of at least two wheels (16) arranged on opposite sides of the axle structure (6). In order to create an axle construction (6) that leaves sufficient installation space to provide the commercial vehicle (2) with an electric drive in the area of the
(Continued)

Figure 1:
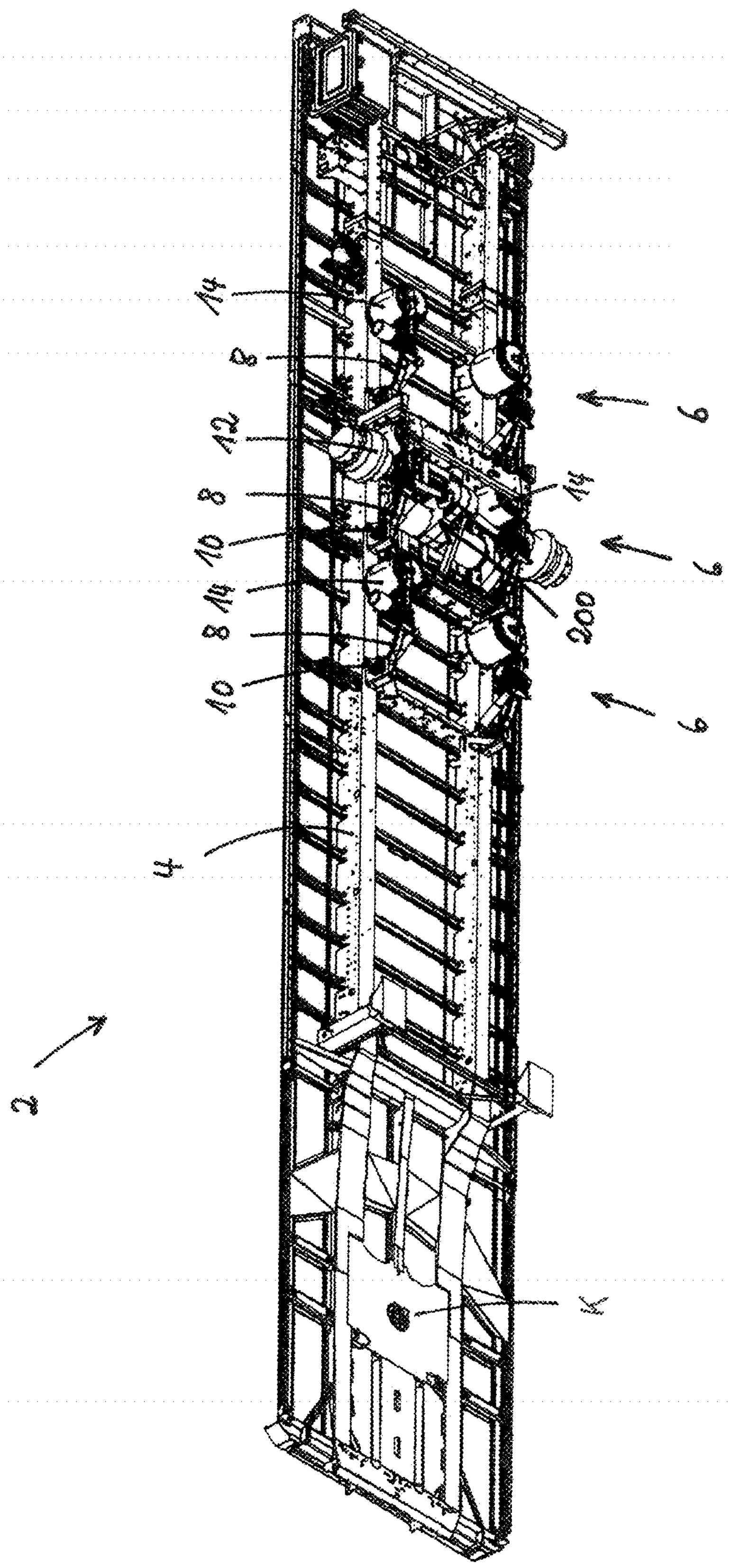

axle construction (6) and that nevertheless enables safe driving behaviour and a high level of driving comfort, according to the invention the steering arms (8) on the side of the wheel axle (R) facing away from the pivot bearings (10) are connected to one another via an axle bridge (22) and a fastening bracket (24) for connecting steering rods (26) is formed in the centre area of the axle bridge (22).

9 Claims, 5 Drawing Sheets

(52) U.S. Cl.
CPC .. *B60G 2204/148* (2013.01); *B60G 2204/418* (2013.01)

(56) References Cited

U.S. PATENT DOCUMENTS

| | | | | |
|---|---|---|---|---|
| 6,808,192 | B1 | 10/2004 | Bol | |
| 6,851,689 | B2 * | 2/2005 | Dudding | B60G 9/00 280/124.13 |
| 7,331,588 | B2 * | 2/2008 | Johnson | B60G 9/00 280/86.754 |
| 7,416,200 | B2 * | 8/2008 | Hass | B60G 7/001 280/124.153 |
| 7,766,352 | B2 * | 8/2010 | Keeler | B60G 7/001 280/124.106 |
| 10,538,135 | B2 * | 1/2020 | Hemmler | B60G 9/022 |
| 11,820,188 | B2 * | 11/2023 | Davis | B60K 1/00 |
| 12,162,321 | B2 * | 12/2024 | Davis | B60K 17/16 |
| 2006/0237938 | A1 | 10/2006 | Imre et al. | |
| 2011/0115184 | A1 | 5/2011 | Johnson et al. | |
| 2013/0154225 | A1 * | 6/2013 | Johnson | B60G 9/022 280/124.116 |
| 2018/0361811 | A1 | 12/2018 | Chua et al. | |

FOREIGN PATENT DOCUMENTS

| | | | | |
|---|---|---|---|---|
| EP | 1648722 | B1 | 7/2011 | |
| EP | 4059755 | A1 | 9/2022 | |
| JP | H07132721 | A | 5/1995 | |
| JP | 2000211332 | A * | 8/2000 | B60G 7/008 |
| JP | 2001287525 | A | 10/2001 | |
| JP | 2005053321 | A | 3/2005 | |
| JP | 4110654 | B2 | 7/2008 | |
| JP | 2013071496 | A | 4/2013 | |
| WO | WO-2008098550 | A1 * | 8/2008 | B60G 9/02 |
| WO | 2010132692 | A1 | 11/2010 | |
| WO | 2017095900 | A1 | 6/2017 | |

OTHER PUBLICATIONS

Georg.Blenk@krafthand-Medien.De. "Der eTrailer von Trailer Dynamics | Krafthand-Truck" Aug. 12, 2022, pp. 1-9, Retrieved from the Internet: https://www.krafthand.de/truck/artikel/auflieger-anders-denken-der-etrailer-von-trailer-dynamics-33224/.

Japanese Office Action dated Apr. 28, 2026 issued in corresponding application 2025-514759.

* cited by examiner

AXLE STRUCTURE FOR A COMMERCIAL VEHICLE CHASSIS HAVING AN AXLE BRIDGE

The present invention relates to an axle structure for a commercial vehicle chassis, and to a commercial vehicle having a corresponding axle structure.

The document DE 101 63 628 A1 discloses an axle structure of the type in question. The wheels are driven via a drive motor arranged at the wheel. The axle bridge is arranged beneath the wheel axis in order to allow a low floor bus to be boarded as low as possible.

The document DE 35 26 272 A1 discloses an axle structure in which a hollow axle beam holds the wheel carriers at its outer ends. The suspension and damper elements are supported against the wheel carriers. The axle beam is in the form of a welded sheet-metal box.

The wheel suspensions are intended to ensure safe handling characteristics and to alleviate losses of driving comfort as a result of road unevenness. In addition, they have to resiliently guide the wheels in the event of jolts without noticeably altering the chassis geometry and at the same time have a suspension travel that is as long as possible, damp vibrations and be as lightweight as possible in order to keep the unsprung masses as low as possible. An excessive toe angle should be avoided, since otherwise tire wear is increased and the tires become worn unevenly in particular cross their width. With an excessive toe angle, it is also possible for the drive forces to no longer be transmitted fully to the ground. Since the requirements are to some extent contradictory, there is always a compromise between design and balancing.

Recently, the problem has additionally arisen of an axle structure making it possible to drive the wheels that are held by the axle structure by means of one or more electric motors. Here, however, there is the problem of the available space in a commercial vehicle being tight.

The present invention addresses the problem of creating an axle structure which leaves sufficient space to provide the commercial vehicle with an electric drive in the region of the axle structure and which nevertheless allows safe handling characteristics and a high level of driving comfort.

The control arms are each mounted pivotably in a pivot bearing which is arranged in a holding device on the frame. Since the control arms are connected together via an axle bridge on the side of the wheel axis facing away from the pivot bearings, better track guidance arises for the wheels fastened to the wheel carriers. The two control arms form, together with the axle bridge, a U-shaped swing arm on which the two wheels are held on opposite sides. Via the axle bridge, transverse forces acting on the axle structure when driving the commercial vehicle are distributed effectively between the two wheels and control arms.

The control arms may be embodied in one or more parts. In the case of a one-part embodiment, they extend as a welded assembly or as a single component cast as a steel casting from the pivot bearing into the region of the attachment of the axle bridge. In the case of a multi-part embodiment, there are divisions between the individual parts, at which divisions the individual parts are joined together to form a control arm, however.

The axle bridge is designed such that it allows unilateral deflection or rebounding of a control arm on one vehicle side without at the same time pulling the control arm located on the other vehicle side upward in the same way or pushing it downward in the same way. Although the axle bridge is constructed preferably in a rigid manner, it—and also the control arms—can carry out torsional movements to a small extent in the event of unilaterally acting loads, with the result that the acting forces are at least partially compensated. Unilateral deflection or rebounding remains possible as a result. This is the case in particular when the bearing bushes of the pivot bearings in which the control arms are held in a holding device on the frame after they have been installed in a commercial vehicle are designed in a soft manner.

Since the axle bridge is arranged in the space on that side of the wheel axis that faces away from the pivot bearings, the available space in the region of the wheel axis between the control arms remains free. A conventional axle tube is not used in this structure. This available space can now be used for drive components of an electric drive for the wheels held by the axle structure.

Formed in the central region of the axle bridge is a fastening bracket for attaching suspension struts. Via these suspension struts, it is possible to set the toe, camber, inclination and caster. The toe describes the length difference by which the two wheels of an axle are closer together at the front than at the rear. If the wheels are closer together at the front, this is referred to as "positive toe" or "toe in", the reverse of "negative toe" or "toe out". The camber in turn describes the angle of the wheel plane to a perpendicular established in the contact patch of the wheel in question, transverse to the vehicle longitudinal axis. On the other hand, the inclination is the angle between the oblique axle and a perpendicular to the roadway transverse to the vehicle longitudinal axis.

The payload can also, given an unsuitable design of the axle geometry, result in a change in the camber angle. Thus, it is possible, as a result of the suspension struts, to adapt the camber as appropriate to the payload usually transported. Cornering forces can, when the tire is running, only arise when there is a slip angle and/or camber. As a result of camber, a favorable stress distribution of the profile particles in the tire contact patch is established. In the case of multi-track vehicles such as commercial vehicles, the basic camber and camber variation are used for partial compensation of the camber angle with respect to the road, which arises at the outer wheel in a bend as a result of the rolling tendency of the vehicle. In the case of single wheel suspensions, the camber-depending on the axle principle and the kinematics of the axle—changes over the suspension travel. By contrast, in the case of rigid axles, the camber with respect to the road remains approximately constant when cornering. In the case of an axle structure in which a convention axle tube has been replaced by an axle bridge which is arranged at a certain offset with respect to the wheel axis, camber variations arise in turn at the wheels on account of the offset of the axle bridge with respect to the wheel axis on cornering and unilateral deflection or rebounding movements of the wheels, these camber variations being caused by torsional movements in the control arms and/or the axle bridge. In an axle structure for a driven axle, in which there is no conventional axle tube and the connection of the pivotable control arms to the driven wheels fastened thereto is established via an axle bridge arranged at an offset to the wheel axis, additional guidance of the wheels and a solution for transferring the wheel forces is therefore necessary. In the design of axle structures for commercial vehicles, in particular including in air-sprung axle structures, it is also important to appropriately dissipate the lateral forces that arise. This is also the case in particular for driven axles in a vehicle, since the transverse forces otherwise have the result that the semitrailer no longer follows the hauled trajectory of the tractor unit.

The first setting of the desired geometry of the wheels to a value on mounting the axle structure on a commercial vehicle and the maintenance of a desired wheel camber, wheel toe, wheel inclination and wheel caster of the driven wheels while the commercial vehicle is being driven and the transmission and compensation of the wheel forces that arise while the commercial vehicle is being driven is now possible via the suspension struts, which can be connected to the axle bridge via the fastening bracket. In order to keep the wheels in a desired geometry and to cushion the forces that arise while the commercial vehicle is being driven, the fastening bracket is formed in the central region of the axle bridge. Suspension struts can be fastened at their first end to the fastening bracket, said suspension struts being connected at their second end to one of the control arms. The forces that act on the control arms during cornering or on account of the payload are transmitted via the suspension struts to the fastening bracket at the axle bridge. The axle bridge thus has a stabilizing effect. The control arms dissipate the forces that act on them from the suspension struts to the wheels and the vehicle frame.

According to one refinement of the invention, the fastening bracket is in the form of a protrusion arranged beneath the upper edge of the axle bridge, the protrusion extending in a direction transverse to the direction of extension of the axle bridge. As a result of the protrusion arranged beneath the upper edge of the axle bridge, the suspension struts can act on the axle bridge at a height which is lower down than the upper edge of the axle bridge. Via the longer lever that is allowed as a result, the suspension struts can absorb higher forces.

According to one refinement of the invention, the suspension struts have a length adjustment device. By way of the suspension struts it is possible to set the camber, the toe, the inclination and the caster of the wheels of the axle structure to a desired value after the axle structure has been fitted on a commercial vehicle. The suspension struts may have an appropriate fixed length. However, it is also possible to embody the geometry of the wheels in a settable manner in that the length of the suspension struts is set with the length adjustment device to a length appropriate for a desired geometry of the wheels. The length adjustment may take place, for example, by way of telescopic tubes that are fixable in a respective extension position, by way of a tensioning screw that is settable with a variable length or by way of other length adjustment devices. The length of the suspension struts which are provided with a length adjustment device can be set to a desired value not only when mounting the axle structure on a vehicle, but also retrospectively while the vehicle is being used. Thus, it is possible to adapt the geometry of the axle to the usual loading of the vehicle.

According to one refinement of the invention, fastening elements for fastening suspension struts are formed on the protrusion, the direction of tension of said fastening elements being oriented, when viewed from above, at an angle <45° and >0° to the direction of extension of the axle bridge. The orientation of the direction of tension of the fastening elements in the specified angular range can be brought about in that the fastening elements are accordingly oriented obliquely to a retaining plate to which the fastening elements are fastened, and/or the retaining plate to which the fastening elements are fastened is arranged in an angular position with respect to the direction of extension of the axle bridge, resulting in the specified angle of the direction of tension. As a result of a direction of tension of the suspension struts, which, when the axle bridge is viewed from above, are oriented at an angle <45° to the direction of extension of the axle bridge, a respective suspension strut, the portion of the axle bridge that is braced by the respective suspension strut, and the portion of the control arm between its attachment to the axle bridge and the point at which the respective suspension strut acts on the control arm form a triangle of forces via which the forces acting on these components are readily distributed. As a result, the suspension struts can effectively support the axle bridge in a direction transverse to the direction of longitudinal extension of the vehicle, and keep the wheels in a desired geometric orientation when the commercial vehicle is being driven. Since the angle is >0°, the suspension struts can transmit not only transverse forces but also longitudinal forces from the axle bridge to the frame. The fasteners may, for example, be in form of bolts onto which a suspension strut can be screwed. However, it is also possible to provide hook-like fasteners or fasteners formed in some other way. Likewise, other fastening elements such as screw connections through suitably embodied connecting points can be used.

According to one refinement of the invention, fastening elements for fastening suspension struts are formed on opposite sides on the protrusion, in each case at least one suspension strut being connected to the associated fastening element or elements, on each side of the protrusion, in a rotatable and/or articulated manner at said fastening elements, and this suspension strut extends from the associated fastening element, in the assembly and rest position of the axle structure in a commercial vehicle, to the attachment point of the suspension strut to the control arm associated with this suspension strut, at a setting angle which deviates by an angular dimension from the direct line between the associated fastening point and the wheel center in the associated wheel. As a result of the fastening elements being arranged on opposite sides of the protrusion, it is possible to transmit the transverse forces that act on the axle structure when the vehicle is cornering to both sides of the vehicle frame. Depending on the direction of action of a transverse force, the fastening elements arranged on a first side of the protrusion are loaded under tension and the fastening elements arranged on the second side of the protrusion are loaded under compression. The transverse forces being introduced into the vehicle frame on both sides results in very good support of the axle structure during cornering.

According to one refinement of the invention, in each case at least two suspension struts are arranged on each side of the protrusion, said suspension struts connecting the protrusion from a respective fastening element to an associated control arm, and the suspension struts are oriented such that the first of the two suspension struts deviates upwardly, toward the control arm, from the direct line between the associated fastening point and the wheel center in the associated wheel, and the second of the two suspension struts deviates downwardly, toward the control arm, from the direct line between the associated fastening point and the wheel center in the associated wheel. In this specific arrangement, the at least two suspension struts each move, upon deformations of the control arms and of the axle bridge, in opposite directions, with the result that they generate a tilting moment on the respective control arm and thus on the wheel fastened thereto. This tilting moment can be used to keep the wheel in a desired geometric setting.

According to one refinement of the invention, the suspension struts are connected to the axle bridge and the control arm at a first end with a molecular joint and at a second end with an axial joint. Molecular joints, which are used in axle struts, suspension arms or the like, in particular in motor vehicles, and contain a rubber-like, elastic joint body, are well known. In general, molecular joints allow a high level of driving comfort, are insensitive to external influences such as dirt, and are maintenance-free. A molecular joint consists of an internally substantially cylindrical housing, a joint pin located approximately in the middle of the housing, and a sleeve-like joint body made from an elastomer material. The joint body is arranged between the housing and the joint pin, adhering to both components and provided a preload. The adjacent faces of the housing and of the joint pin are formed such that joint body does not rest fully against the housing in the rest state of the joint. To this end, preferably in the central region of the housing, a material recess is formed, which creates a clearance between the housing and joint body. As a result of the clearance, the preload in the joint body is reduced and thus a variable characteristic behavior of the molecular joint is achieved, in particular a progressive spring characteristic of the elastic joint body, such that, under a low load with significant deflection, a low spring rate is established and, under a high load with relatively little deflection, a high spring rate results. As a result, soft damping and suspension of the vehicle movements with small displacements is possible, and a hard characteristic under high loads, which arise for example in the case of rapidly executing driving or braking maneuvers or a poor road quality. An axial joint allows, in the vehicle, linear transmission of the forces and is used everywhere where mobility alongside the axle is required. The axial joint in particular allows the suspension struts to likewise be able to be mounted when higher manufacturing tolerances arise, which cannot be avoided with this large and welded structure.

According to one refinement of the invention, the control arms and the axle bridge are each connected together by at least three screw connections. In the event of an offset of the wheel axle with respect to an axle bridge in an axle structure, high shear and tensile forces arise in the transition region from the control arms to the axle bridge, when the commercial vehicle equipped with the axle structure is cornering and/or the control arms deflect or rebound. A screw connection affords advantages compared with conventional welded connections. In order to make the screw connections sufficiently loadable, at least three screw connections are required, however, in order to connect a control arm sufficiently firmly and durably to an axle bridge.

According to one refinement of the invention, the outer ends of the axle bridge have two plates which are arranged at a distance from one another and which, in the assembled state of the axle structure on a vehicle, are in an at least approximately horizontal orientation, wherein, between the plates, at least one sleeve is arranged, the longitudinal center axis of which extends, in the installed state of the axle structure in a vehicle, in an at least approximately vertical direction, at least one of the two plates has, in the continuation of the longitudinal center axis of the sleeve, a passage opening through which a bolt that fits into the sleeve is passed, an intermediate space is formed between the two plates and one end of the sleeve, into which intermediate space a connecting element of a control arm is inserted, the connecting element of the control arm likewise has, in the continuation of the longitudinal center axis of the sleeve, a passage opening through which the bolt that fits into the sleeve is passed, and at least the side, facing away from the sleeve, of one of the two plates has a clamping surface against which a nut or a head of the bolt is screwed. With the above-described structure, the axle bridge and the control arms can be connected firmly together in a simple manner, in particular by means of an advantageous screw connection which allows separate fitting and removal of the components from one another. The sleeve can be embodied as a simple clamping sleeve or as a screw sleeve with an internal thread. The sleeve can be firmly connected to a plate, for example by a welded connection, and the screw connection then takes place against the other plate, or the sleeve is inserted, as a simple spacer sleeve, onto a bolt which braces the two plates together. The connecting element of the control arm may be a plate-form leg of the control arm, which has been inserted into the intermediate space between the sleeve and the second plate and has then been screwed to the axle bridge by the bolt inserted through the passage opening. Of course, it is possible for more than one sleeve with a number of passage openings corresponding to the number of sleeves used to be present at the ends of the axle bridge, such that the control arm associated with one and of the axle bridge can be connected thereto via a plurality of bolts. When the control arm is connected to the axle bridge by means of a plurality of bolts, a sufficiently firm, durable and maintenance-free connection of the two components to one another can be created.

It is noted that the refinements of the invention that are set out above can each be combined separately, but also among one another, as long as this is not prevented by any technical obstacles and there are no obligatory dependences.

Further modifications and refinements of the invention can be gathered from the claims, the description and the drawings.

The invention will be explained in more detail in the following text with reference to an exemplary embodiment. In the figures:

FIG. 1: shows an overall view, obliquely from below, of an electric drive train installed in a commercial vehicle, FIG. 2: shows a top view of the axle structure, FIG. 3: shows a rear view of the axle structure, FIG. 4: shows an enlarged illustration of an outer end of the axle bridge, and FIG. 5: shows the illustration, shown in FIG. 4, of an outer end of the axle bridge with a screw connection.

FIG. 1 shows an overall view, obliquely from below, of a commercial vehicle 2 in the form of a truck trailer, in which an electric drive train 200 is installed. The commercial vehicle 2 has a vehicle frame 4, which is supported on the ground via three axle structures 6 in the exemplary embodiment. The central axle structure 6 has the electric drive train 200, and the axle bridge and axle have been omitted from the two other axle structures in order to simplify the drawing. In the front region, the commercial vehicle is placed by way of the kingpin K on the semitrailer coupling of a semitrailer truck (not illustrated in more detail in the drawing) and hauled via the latter.

The axle structures 6 each have, on opposite sides of the vehicle frame 4, a control arm 8, each of which is connected to the vehicle frame 4 via a pivot bearing 10 arranged in a retaining bracket. Also fastened to each control arm 8 is a wheel carrier 12, on which the wheels of the commercial vehicle 2 can then be screwed. At their end remote from the pivot bearing 10, the control arms 8 are also each supported on the vehicle frame 4 via a spring element 14. The control arms 8 thus rotate about the pivot bearing 10 in the event of spring movements and spring counter to the restoring forces in the flexible spring elements 14.

Figure 2:
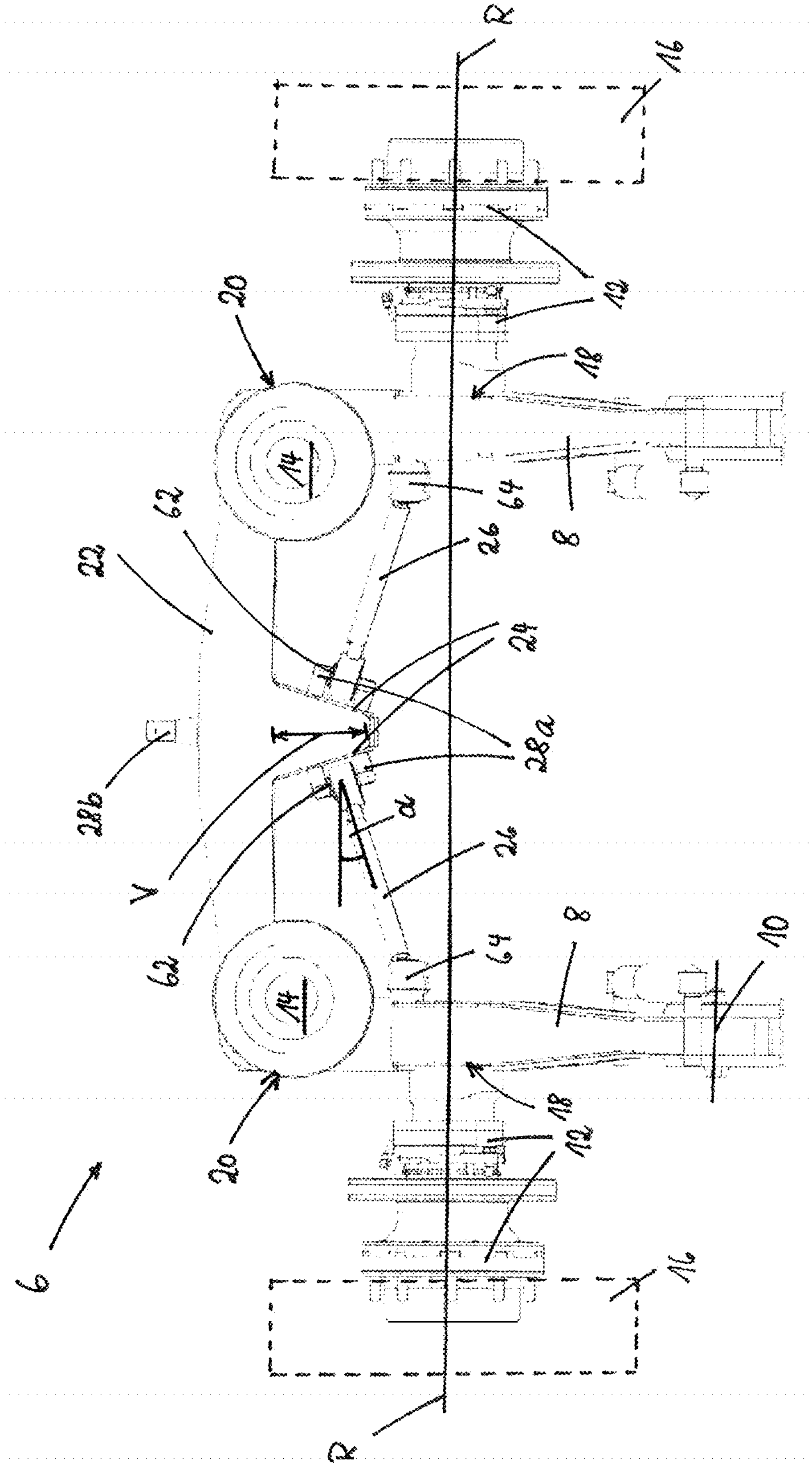

FIG. 2 shows a top view of the axle structure 6. In this view, the wheel axis R is readily apparent, the spatial position of which is determined by axes of rotation of at least two wheels 16 arranged on opposite sides of the axle structure 6. The wheels 16 are each held via a wheel carrier 12 on a control arm 8 connected thereto. The control arms 8 are arranged at a distance from one another along the wheel axis R and are each oriented in a direction transverse to the wheel axis R. The control arms 8 each have at a first end a pivot bearing 10, at a first distance from the pivot bearing 10 an interface 18 for attaching a wheel carrier 12 to the respective control arm 8, and at a second distance from the pivot bearing 10 a support section 20 for connecting the respective control arm 8 to a spring element 14.

The control arms 8 are connected together via an axle bridge 22 on that side of the wheel axis R that faces away from the pivot bearings 10. The control arms 8 are also connected to the axle bridge 22 in the region of the support section 20 for connecting the respective control arm 8 to a spring element 14. Formed in the central region of the axle bridge 22 is a fastening bracket 24 for attaching suspension struts 26. In the exemplary embodiment shown, the fastening bracket 24 is in the form of a protrusion V which is arranged beneath the upper edge of the axle bridge 22 and extends in a direction transverse to the direction of extension of the axle bridge 22. Formed on the protrusion V are fastening elements **28*a* for fastening suspension struts 26, the direction of tension of which, when viewed from above, is oriented at an angle $\alpha<45°$ and $>0°$ to the direction of extension of the axle bridge 22**.

Figure 3:
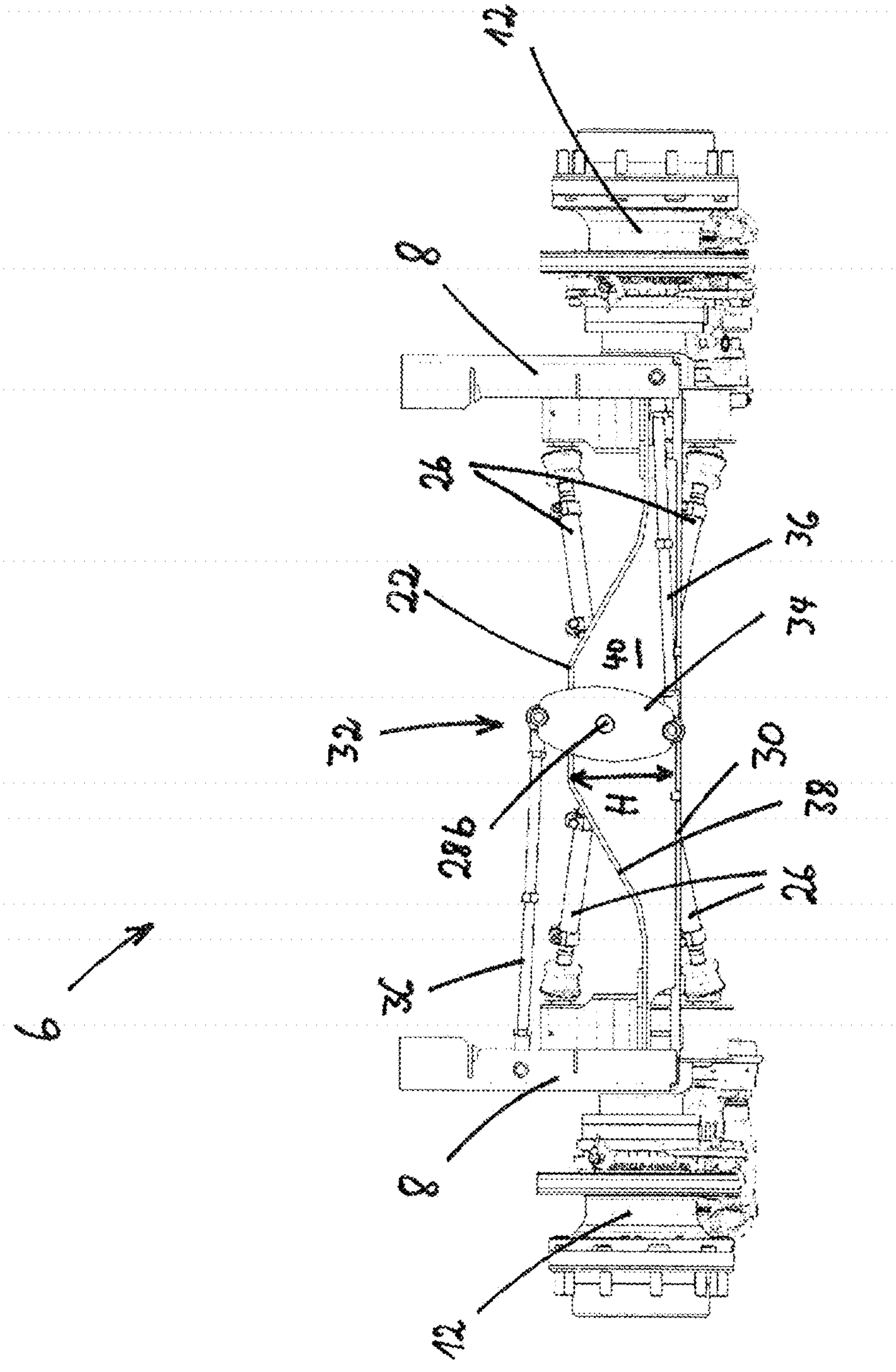

As can be seen in FIGS. 2 and 3, in each case at least two suspension struts 26 are arranged on each side of the protrusion V, said suspension struts connecting the protrusion V from a respective fastening element **28*a* to an associated control arm 8, and the suspension struts 26 are oriented such that the first of the two suspension struts 26 deviates upwardly, toward the control arm 8, from the direct line between the associated fastening point on the fastening element 28*a* and the wheel center in the associated wheel 16, and the second of the two suspension struts 26 deviates downwardly, toward the control arm 8, from the direct line between the associated fastening point on the fastening element 28*a* and the wheel center in the associated wheel 16**.

Fastening elements **28*a* for fastening suspension struts 26 are formed on opposite sides on the protrusion V, in each case at least one suspension strut 26 being connected to the associated fastening element or elements 28*a*, on each side of the protrusion V, in a rotatable and/or articulated manner at said fastening elements, and this suspension strut 26 extends from the associated fastening element 28*a*, in the assembly and rest position of the axle structure 6 in a commercial vehicle, to the attachment point of the suspension strut 26 to the control arm 8 associated with this suspension strut 26, at a setting angle which deviates by an angular dimension from the direct line between the associated fastening point and the wheel center in the associated wheel 16. The suspension struts may have a length adjustment device such that they allow the chassis to be adjusted individually. The suspension struts 26 are connected to the axle bridge 22 and the control arm 8 at a first end with a molecular joint 62 and at a second end with an axial joint 64**.

FIG. 3 shows a rear view of the axle structure. It is apparent from the view that the axle bridge 22 is a welded structure in the form of a box with a base plate 30, a cover plate 38, and two side plates 40. The base plate 30 on the underside of the axle bridge 22 extends across the width of the axle bridge 22 in an at least approximately constant plane. The side plate 40 and thus the axle bridge 22 have, in their central portion, a greater overall height H than in the outer peripheral regions. Formed on the axle bridge 22 is a fastening element **28*b* for attaching a track guidance device 32. In the exemplary embodiment, the track guidance device 32 is embodied as a Watt's linkage. The fastening element 28*b* is a shaft, onto which the articulated plate 34 has been rotatably placed. By way of the articulated plate 34, the internal ends of the two wishbones 36 are connected via pivot joints. The outer ends of the wishbones 36 are each connected to a control arm. Via the Watt's linkage, a tilting movement of a control arm 8 in a direction transverse to the direction of travel is transmitted to the other control arm 8**.

Figure 4:
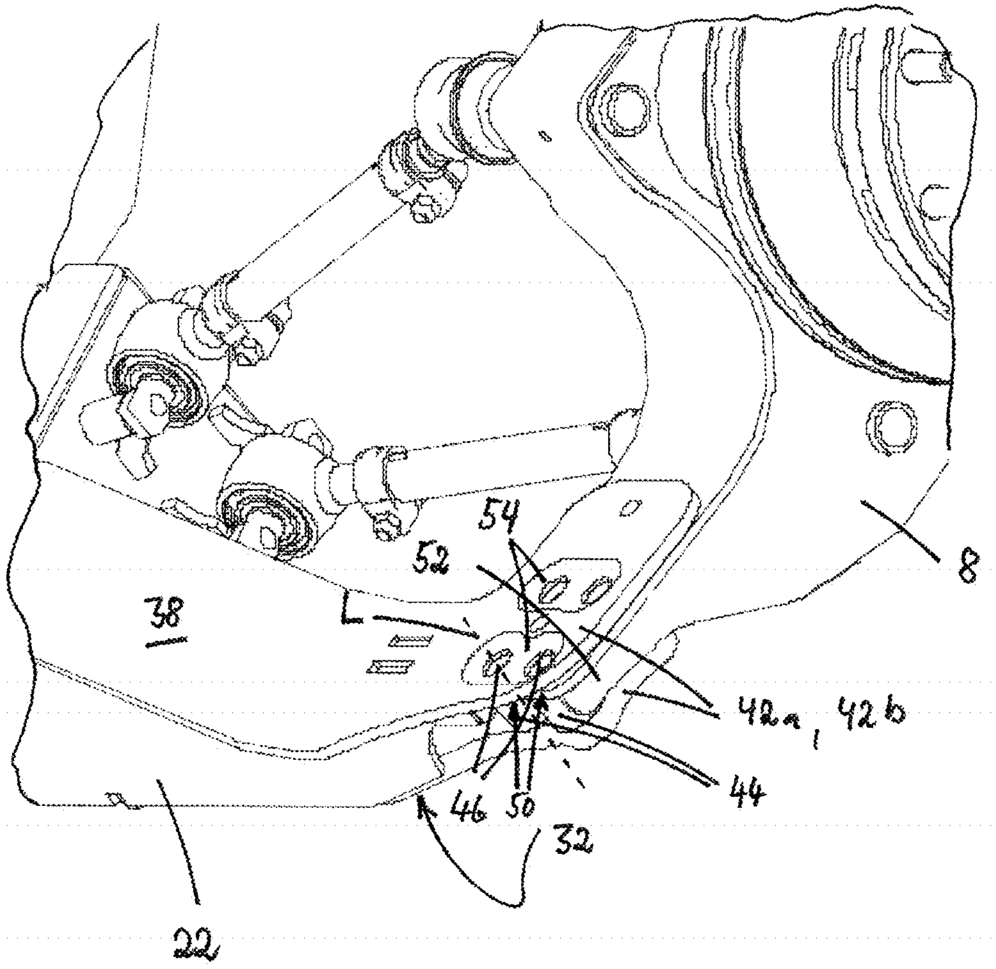

It is apparent from FIG. 4, by way of an enlarged illustration of an outer end of the axle bridge 22, that this end has two plates **42*a*, 42*b* which are arranged at a distance from one another and which, in the assembled state of the axle structure 6 on a vehicle 2, are in an at least approximately horizontal orientation. Firmly connected to the first plates 42*a* is at least one sleeve 44, the longitudinal center axis L of which, which is illustrated by a dashed line in FIG. 4, extends, in the installed state of the axle structure 6 in a vehicle 2, in an at least approximately vertical direction. The two plates 42*a*, 42*b* have, in the continuation of the longitudinal center axis L of the sleeve 44, a passage opening 46 through which a bolt 48 that fits into the sleeve 44 can be passed. An intermediate space 50 is formed between the two plates 42*a*, 42*b* and one end of the sleeve 44, into which intermediate space a connecting element 52 of a control arm 8 is inserted. The connecting element 52 of the control arm 8 likewise has, in the continuation of the longitudinal center axis L of the sleeve 44, a passage opening 46 through which the bolt 48 that fits into the sleeve 44 is passed, as is shown in FIG. 5. In the exemplary embodiment, the two sides, facing away from the sleeve 44, of the two plates 42*a*, 42*b* have a clamping surface 54 against which a nut or a head of the bolt 48 is screwed. When a bolt 48 has been screwed together with a screw sleeve 44 welded on the inner side of one of the two plates 42*a*, 42*b*, it is sufficient, of course, for only the plate 42*a*, 42*b* that is not welded to the screw sleeve 44 to have a clamping surface 54. The control arms 8 and the axle bridge 22** are each connected together by at least three screw connections.

Figure 5:
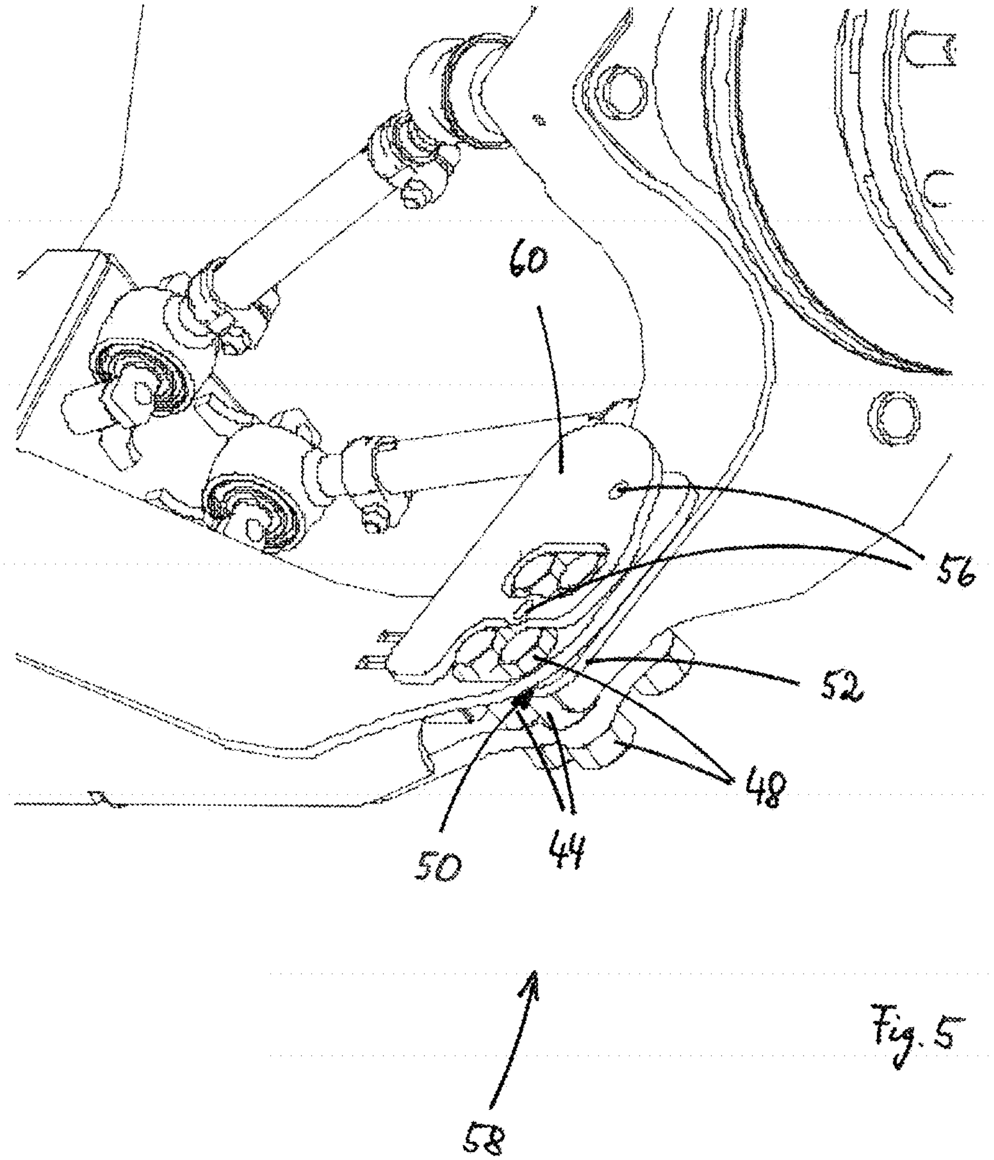

FIG. 5 also shows that the axle bridge 22 has, at the outer end illustrated therein, a fastener for connecting to an air bellows as an example of a spring element 14. In the exemplary embodiment shown, the fastener is the two screw holes 56, via which an air bellows can be screwed together with the axle structure 6. That end of the axle bridge 22 that is illustrated in FIGS. 4 and 5 formed, with the two plates **42*a*, 42*b* and the connecting element 52, a connecting node 58, via which the axle bridge 22 is connected both to the control arm 8 and to the air bellows. In the exemplary embodiment, a bellows carrier 60 has been placed on the upper one of the two plates 42*a*, 42*b* located at one end of the axle bridge 22, and has been firmly connected to the axle bridge 22**.

The invention is not restricted to the above-described exemplary embodiment. A person skilled in the art will have no difficulty in modifying the exemplary embodiment in a manner that appears to be suitable to them in order to adapt it to a specific application.

LIST OF REFERENCE SIGNS

2 Commercial vehicle
4 Vehicle frame

6 Axle structure
8 Control arm
10 Pivot bearing
12 Wheel carrier
14 Spring element
16 Wheel
18 Interface for attaching a wheel carrier
20 Support section
22 Axle bridge
24 Fastening bracket
26 Suspension struts
28 Fastening element
30 Base plate
32 Track guidance device
34 Articulated plate
36 Wishbone
38 Cover plate
40 Side plate
42 Plate
44 Sleeve
46 Passage opening
48 Bolt
50 Intermediate space
52 Connecting element
54 Clamping surface
56 Screw hole
58 Connecting node
60 Bellows carrier
62 Molecular joint
64 Axial joint
200 Electric drive train
R Wheel axis
V Protrusion
L Longitudinal center axis

The invention claimed is:

1. An axle structure (6) for a commercial vehicle chassis, having a wheel axis (R), the spatial position of which is determined by axes of rotation of at least two wheels (16) arranged on opposite sides of the axle structure (6), the wheels (16) are each held via a wheel carrier (12) on a control arm (8) connected thereto, the control arms (8) are arranged at a distance from one another along the wheel axis (R) and are each oriented in a direction transverse to the wheel axis (R), the control arms (8) each have at a first end a pivot bearing (10), at a first distance from the pivot bearing (10) an interface (18) for attaching a wheel carrier (12) to the respective control arm (8), and at a second distance from the pivot bearing (10) a support section (20) for connecting the respective control arm (8) to a spring element (14), characterized in that the control arms (8) are connected together via an axle bridge (22) on a side of the wheel axis (R) facing away from the pivot bearings (10) and a fastening bracket (24) for attaching suspension struts (26) is formed in a central region of the axle bridge (22), wherein the suspension struts (26) are connected to the axle bridge (22) and the control arm (8) at a first end with a molecular joint (62) and at a second end with an axial joint (64).

2. The axle structure as claimed in claim 1, characterized in that the fastening bracket (24) is in the form of a protrusion (V) arranged beneath an upper edge of the axle bridge (22), the protrusion extending in a direction transverse to a direction of extension of the axle bridge (22).

3. The axle structure as claimed in claim 1, characterized in that the suspension struts (26) have a length adjustment device.

4. The axle structure as claimed in claim 1, characterized in that fastening elements (28*a*) for fastening suspension struts (26) are formed on a protrusion (V), a direction of tension of said fastening elements being oriented, when viewed from above, at an angle (α)<45° and >0° to a direction of extension of the axle bridge (22).

5. The axle structure as claimed in claim 1, characterized in that fastening elements (28*a*) for fastening suspension struts (26) are formed on opposite sides on a protrusion (V), in each case at least one suspension strut (26) being connected to the associated fastening element or elements (28*a*), on each side of the protrusion (V), in a rotatable and/or articulated manner at said fastening elements, and this suspension strut (26) extends from the associated fastening element (28*a*), in an assembly and rest position of the axle structure (6) in a commercial vehicle, to an attachment point of the suspension strut (26) to the control arm (8) associated with this suspension strut (26), at a setting angle which deviates by an angular dimension from a direct line between the associated fastening point and a wheel center in the associated wheel (16).

6. The axle structure as claimed in claim 5, characterized in that in each case at least two suspension struts (26) are arranged on each side of the protrusion (V), said suspension struts connecting the protrusion (V) from a respective fastening element (28*a*) to an associated control arm (8), and the suspension struts (26) are oriented such that the first of the two suspension struts (26) deviates upwardly, toward the control arm (8), from the direct line between the associated fastening point and the wheel center in the associated wheel (16), and the second of the two suspension struts (26) deviates downwardly, toward the control arm (8), from the direct line between the associated fastening point and the wheel center in the associated wheel (16).

7. The axle structure as claimed in claim 1, characterized in that the control arms (8) and the axle bridge (22) are each connected together by at least three screw connections.

8. The axle structure as claimed in claim 1, characterized in that outer ends of the axle bridge (22) have two plates (42*a*, 42*b*) which are arranged at a distance from one another and which, in an assembled state of the axle structure (6) on a vehicle (2), are in an at least approximately horizontal orientation, wherein, between the two plates (42*a*, 42*b*), at least one sleeve (44) is arranged, a longitudinal center axis (L) of which extends, in an installed state of the axle structure (6) in a vehicle (2), in an at least approximately vertical direction, at least one of the two plates (42*a*, 42*b*) has, in a continuation of the longitudinal center axis of the at least one sleeve (44), a passage opening (46) through which a bolt (48) that fits into the at least one sleeve (44) is passed, an intermediate space (50) is formed between the two plates (42*a*, 42*b*) and one end of the at least one sleeve (44), into which intermediate space a connecting element (52) of a control arm (8) is inserted, the connecting element (52) of the control arm (8) likewise has, in the continuation of the longitudinal center axis of the sleeve (44), a passage opening (46) through which the bolt (48) that fits into the at least one sleeve (44) is passed, and at least a side, facing away from the sleeve (44), of one of the two plates (42*a*, 42*b*) has a clamping surface (54) against which a nut or a head of the bolt (48) is screwed.

9. A commercial vehicle (2) having an axle structure (6) for a commercial vehicle chassis, having a wheel axis (R), the spatial position of which is determined by axes of rotation of at least two wheels (16) arranged on opposite sides of the axle structure (6), the wheels (16) are each held via a wheel carrier (12) on a control arm (8) connected thereto, the control arms (8) are arranged at a distance from one another along the wheel axis (R) and are each oriented in a direction transverse to the wheel axis (R), the control arms (8) each have at a first end a pivot bearing (10), at a first distance from the pivot bearing (10) an interface (18) for attaching a wheel carrier (12) to the respective control arm (8), and at a second distance from the pivot bearing (10) a support section (20) for connecting the respective control arm (8) to a spring element (14), the axle structure comprising an axle bridge (22), wherein the control arms (8) are connected together via the axle bridge (22) on a side of the wheel axis (R) facing away from the pivot bearings (10) and a fastening bracket (24) for attaching suspension struts (26) is formed in the central region of the axle bridge (22), wherein the suspension struts (26) are connected to the axle bridge (22) and the control arm (8) at a first end with a molecular joint (62) and at a second end with an axial joint (64).

* * * * *